United States Patent [19]

Nielsen

[11] Patent Number: 5,232,720

[45] Date of Patent: Aug. 3, 1993

[54] METHOD OF PRODUCING A CHEESE AND PREPARING IT FOR DISTRIBUTION

[75] Inventor: John Nielsen, Karise, Denmark

[73] Assignee: Tetra Alfa Holdings S.A., Pully, Switzerland

[21] Appl. No.: 782,303

[22] Filed: Oct. 24, 1991

[30] Foreign Application Priority Data

Nov. 7, 1990 [SE] Sweden .............................. 9003541

[51] Int. Cl.⁵ .............................................. A23C 9/12
[52] U.S. Cl. ...................................... 426/39; 426/40; 426/491; 426/582
[58] Field of Search ............... 426/36, 39, 38, 40, 426/41, 42, 43, 491, 582

[56] References Cited

U.S. PATENT DOCUMENTS

| | | |
|---|---|---|
| 3,899,595 | 8/1975 | Stenne . |
| 4,131,688 | 12/1978 | Grosclaude et al. . |
| 4,268,528 | 5/1981 | Montigny . |
| 4,401,679 | 8/1983 | Rubin et al. . |
| 4,416,904 | 11/1983 | Shannon ................................ 426/19 |
| 4,460,609 | 7/1984 | Kristiansen et al. .................. 426/39 |

FOREIGN PATENT DOCUMENTS

| | | |
|---|---|---|
| 555869 | 6/1983 | Australia . |
| 0297676 | 1/1989 | European Pat. Off. . |
| 2475361 | 8/1981 | France . |
| WO85/00501 | 2/1985 | PCT Int'l Appl. . |
| WO91/00690 | 1/1991 | PCT Int'l Appl. . |

OTHER PUBLICATIONS

U.S.S.R. Inventor's Certificate No. 451,432, translation of claims only.
U.S.S.R. Inventor's Certificate No. 931,139, translation of claims and references cited only.
Gorbatov, K. K., *Biochemistry of Milk and Dairy Products*, Moscow, Publ. Light and Food Industry, 1984, pp. 232–233.
Ynyhov, G. S. *Biochemistry of Milk and Dairy Products*, Publ. Food Industry M., p. 204, 1970.

Primary Examiner—Joseph Golian
Assistant Examiner—Leslie Wong
Attorney, Agent, or Firm—Burns, Doane, Swecker & Mathis

[57] ABSTRACT

In a method for the preparation of cheese for distribution, milk is concentrated to a dry matter content corresponding to a desired dry matter content of finished cheese through the separation of whey. The concentrated milk is mixed with additives including a substance capable of forming carbon dioxide upon mixing with lactic acid bacteria occurring naturally in milk. When the concentrated milk/additive mixture is packaged into distribution-ready packagings in which it coagulates to form cheese, the carbon dioxide forms tubular passages in the cheese.

6 Claims, 1 Drawing Sheet

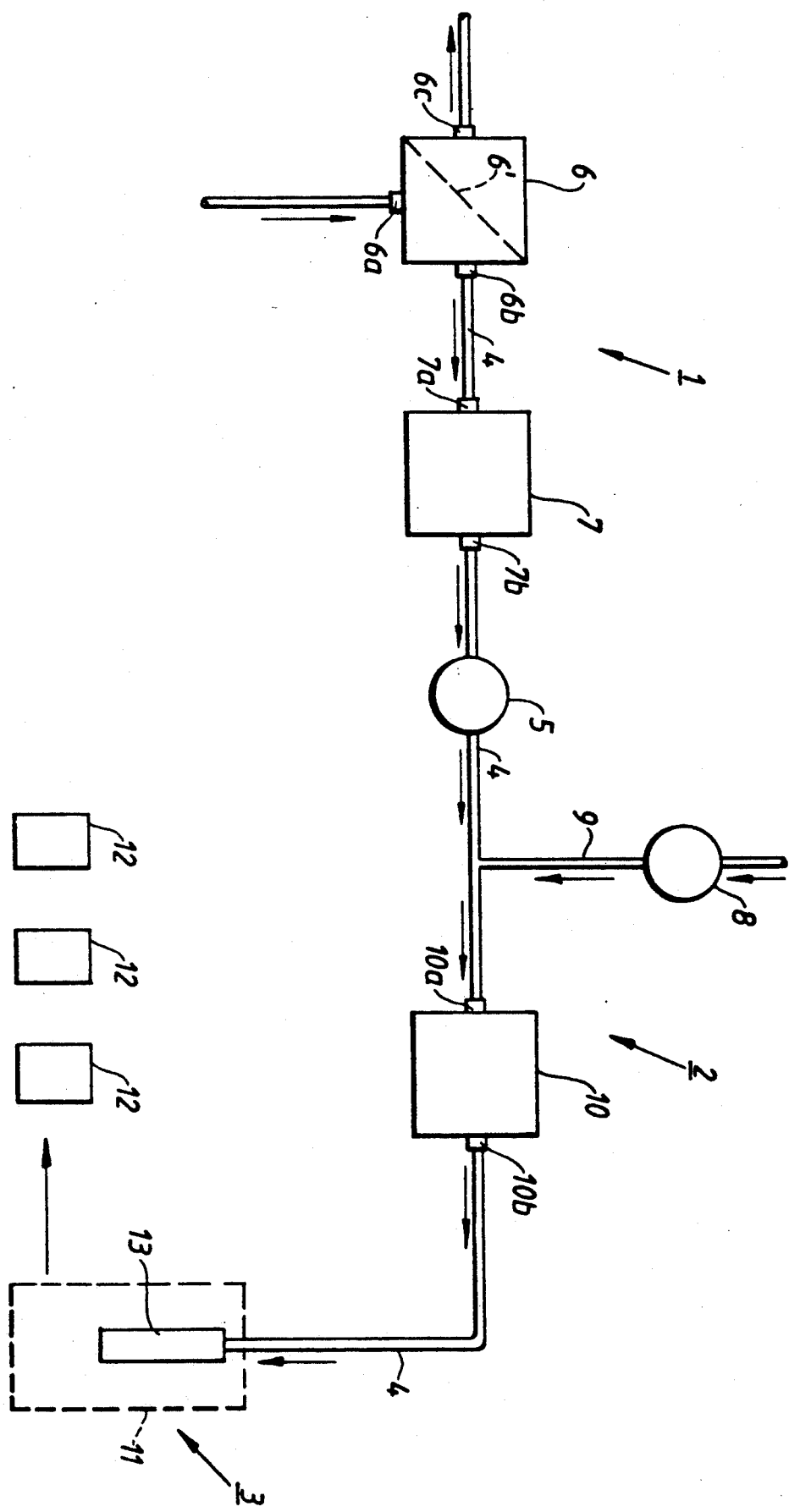

METHOD OF PRODUCING A CHEESE AND PREPARING IT FOR DISTRIBUTION

FIELD OF THE INVENTION

The present invention concerns a method of producing a cheese and preparing it for distribution. More particularly, this invention relates to a method for production of cheese where pretreated milk is first concentrated by the whey being separated from the milk, and the concentrated milk obtained being subsequently added to and mixed with additives necessary for coagulation of the milk and other optional additives for cheese production.

BACKGROUND OF THE INVENTION

In traditional cheese production, pretreated milk without previous concentration is added to and mixed with additives necessary for the production of cheese, such as rennet and/or other proteolytic enzymes for coagulation of the milk. By concentrating the milk prior to production subsequent stages of production can be carried out with a reduced process flow and with processing equipment requiring less space and expense as a result of this. In addition the concentration permits reduction of the quantity of additives needed for coagulation of the milk, permitting more effective utilization of these additives.

U.S. application Ser. No. 07/782,321, filed Oct. 24, 1991, corresponding to Swedish Patent Application No. 9003540-3, described how the cheese production method described above, in which milk is concentrated, can be made more effective and can be modified such that it can be carried out completely automatically and on a rational industrial scale. According to this U.S. patent application no., which is incorporated herewith in its entirety as a reference, these further advantages are achieved through concentrating the pretreated milk to a dry matter (DM) content corresponding to the DM content in the finished cheese and through drawing off and packaging the mixture of concentrated milk and additives directly into distribution-ready packagings, i.e. performing the separation of the whey during the concentration of the milk so long as no further subsequent separation of whey is required, allows the coagulation and forming of the milk to occur without need for separate coagulation or forming.

In the above-noted U.S. patent application it is further proposed that the concentration of the pretreated milk should preferably be carried out through use of an ultra-filtering device with a filter having a pore size such that all proteins, fats and other constituents valuable for cheese production occurring in the milk are retained in it as pre-cheese retained matter through filtering the extracted concentrated milk and permitting the whey to pass freely through the filter.

According to the above-noted application, in conventional production of cheese the milk pretreated for cheese production is mixed with additives necessary for coagulation of the milk, most frequently rennet and/or other proteolytic enzymes, to form a gel. When the gel has reached a predetermined solidity, the gel is broken up with the aid of special tools, known as breaking tools, so that smaller cubes with the desired size are formed. The broken up cheese mass is then subjected to mechanical treatment at the same time as the mass is heated according to a preset scheme, through which the whey is pressed out of and separated from the mass. After conclusion of the treatment/heating the mass is placed in molds which determine the cheese's final shape, after which the cheese thus formed are packaged in packagings of different types intended for distribution.

The conventional procedure described is time-consuming and most frequently requires manual monitoring and control in order to maintain the constant process conditions necessary for the desired quality of cheese during each one of the production stages. The procedure is, in addition, one which, form the point of view of equipment, requires a great deal of space and can only with difficulty be automated and carried out on a desired rational industrial scale.

Problems of the above type are solved at least partly through another known production procedure which takes as its starting point the fact that the pretreated milk is first concentrated through a liquid fraction (whey) being separated from the milk and the concentrated (protein- and fat-enriched) milk obtained is then added to and mixed with additives necessary for coagulation of the milk. Here it has proven to be particularly valuable to concentrate the milk through ultra-filtering, through which the separated liquid fraction can be made practically free from protein, fat and other constituents desirable for cheese production occurring in the milk which are thus retained in the concentrated milk extracted as pre-cheese retained matter. According to this known technology, among other things, the advantage is gained that practically all valuable constituents occurring in the milk can be retained and, depending on the degree to which the milk is concentrated, the amount of rennet and/or proteolytic enzymes added for the coagulation can be reduced to a corresponding degree with cost savings gained thereby. Further, the advantage is gained that the production process after the milk concentration can be carried out with considerably less process equipment requiring space and investment than the previously described conventional cheese production.

It has, however, been shown that the last described known production procedure can further be made more effective to yield a procedure for cheese production which functions well on a rational, industrial scale and which can in addition be carried out in a practically entirely automated manner.

This aim is achieved according to such a procedure, described in the above-noted application, through the fact that the procedure described in the introduction is given the characteristics that the milk is concentrated to a DM content corresponding to the DM content in the finished cheese and that the mixture of concentrated milk and additives is drawn off and packaged directly into distribution-ready packagings.

Through concentrating the milk from the beginning to a DM content corresponding to the DM content of the finished cheese a subsequent further whey separation stage is thus avoided, at the same time as such a concentration entails that the mixture of concentration milk and additives can be packaged directly into the finished packagings with a previous coagulation stage. In the method according to the above-noted application the coagulation of the milk thus occurs practically entirely in these packagings.

According to the above-noted application it has proved to be possible and particularly valuable to use as packagings for the coagulated cheese mass the same type of packagings as is often used to package liquid foods such as milk, juice, etc., which are produced with the aid of modern, rational packaging machines of the type which both forms, fills and closes the finished packagings. A well known example of such a packaging is the packaging manufactured from a strip of plastic coated paper of the type TETRA BRIK (trade mark).

For example it has been shown, according to the above-noted application, to be possible to produce a cheese with a chemical composition with regard to fat, total protein, salt and DM content corresponding to a semi-solid, ripe cheese of SCT. Paulin type (popularly called a soft Danbo) with the use of the following additives:

glucone lactone (GDL, chemical acidification agent) which on slurrying in the water converts from a pH-neutral product to an acid product containing lactic acid with a pH value of 5.2.

Colorants
Flavourings
NaCl
Rennet

Through suitable choice of additives in this sphere which are in themselves known it is thus possible continuously to produce and prepare for distribution cheeses of different types on a rational industrial scale in the manner according to the above-noted application which, in contrast to the hitherto known procedures, can be carried out with a minimum number of involved production stages and which, through the included full concentration of the milk before the addition of the additives selected for the cheese production, offers the substantial advantage that the mixture of the milk and the aforesaid additives can be filled directly and packaged into distribution-ready packagings in such a way that the coagulation of the milk and also the forming of the cheese occur essentially entirely in these packagings.

The cheese produced by the method according to the above-noted U.S. patent application complies in practice with all requirements set for cheese as far as concerns taste, colour, consistency, maturity, DM content and content of fats, protein, salt and other desirable constituents. However, the cheese produced by this process either lacks completely or only exhibits imperfectly developed holes or tubular passages which contribute to giving certain types of cheese their typical and easily recognizable appearance which is generally regarded by the consumer as a guarantee of a "genuine" cheese quality.

OBJECTS AND SUMMARY OF THE INVENTION

It is therefore desirable to provide a method in which the advantages of the above-noted Swedish patent application are retained and the cheese produced by the method is provided with tubular passages.

Even if the real reason why such holes or tubular passages either do not occur at all or develop only imperfectly is not fully explained, it has been shown, in accordance with this invention, that they can be created if there is also added to the concentrated milk, together with the remaining additives selected for the cheese production, a chemical substance of the type which, under the action of lactic acid bacteria occurring in the milk, has the capacity to form carbon dioxide gas ($CO_2$ gas).

This object of creating tubular passages in cheese produced by the above-described method is achieved according to a preferred embodiment of the present invention by concentrating the milk to a dry matter content (DM content) corresponding to the DM content in the finished cheese, and adding as one of the chemical additives a chemical substance with the capacity to form carbon dioxide gas ($CO_2$ gas) under the action of lactic acid bacteria occurring in the milk. Next the mixture of concentrated milk and additives is filled directly into distribution-ready packagings. The coagulation and forming of the cheese occurs essentially entirely in the packagings with the result that holes in the coagulated milk developed by $CO_2$ gas formed contribute to the formation of the desired tubular passage structure in the finished cheese.

In an embodiment of the invention the chemical substance for forming $CO_2$ gas citric acid. Besides producing the $CO_2$ gas desired for the formation of the tubular passages, citric acid also gives rise, during fermentation, to other valuable decomposition products such as acetic acid, which has a positive effect on the impression of taste of the cheese. In a further embodiment the chemical substance such as citric acid, is enclosed in capsules of material with controllable permeability and stability properties. It is, in this way, possible to control the rate of conversion of the chemical substance to carbon dioxide, which preferably occurs slowly to avoid the risk of improper formation of tubular passages in the cheese.

In further embodiments of the present invention preferred capsules materials are butter fat or liposomes which are microscopic phosphor lipid bubbles and occur naturally in cheeses. Liposomes, which are produced, for example, from lecithin, which is often used as an emulsifier in the food industry, have proven to be particularly easy to control in respect of permeability and stability properties through small changes in the liposome's lipid composition, and are particularly preferred. A further advantage is that liposomes distribute themselves uniformly in the cheese's aqueous phase just precisely where the carbon dioxide forms holes after the saturation point of the water has been reached. The liposomes' permeability and stability properties are controlled through modifying the liposomes in such a way that they open and release the citric acid as a reaction in response to signals such as changes in pH or temperature. As it is known that a reduction in pH occurs naturally in the cheese after the mixing in of the added lactic acid bacteria in the concentrated milk, the composition of the liposomes is preferably modified in such a way that this change in pH can be used as an activation signal for the opening of the liposomes to release of the citric acid that they contain.

BRIEF DESCRIPTION OF THE DRAWING

The drawing is a schematic diagram of an arrangement suited for carrying out the claimed method.

DETAILED DESCRIPTION

The arrangement shown comprises three primary elements, namely concentrating/heating station 1, a dosing/mixing station 2 and a filling station 3, which are connected with each other in the order just listed by a common process pipe 4. Between the concentration/heating station 1 and the dosing/mixing station 2 there is, in addition, a pump 5 attached to the process pipe 4.

The concentrating/heating station 1 has a concentrating device 6 and includes an inlet 6a for incoming, pretreated milk, an outlet 6b for concentrated milk and an outlet 6c for the separated liquid fraction (whey). The concentrating/heating station 1 also has a heating device 7 provided with an inlet 7a and outlet 7b, with the inlet 7a in the heating device 7 being connected with the outlet 6b in the concentrating device 6 through the process pipe 4.

The concentrating device 6 will usually consist of an ultra-filtering device of a type which is well known; The filter 6' of the ultra-filtration device has a pore size such that all proteins, fats and other constituents valuable for cheese production which occur in the milk remain as pre-cheese retained matter in the concentrated milk that is extracted. The heating device 7 will usually be a heat exchanger of conventional type. The concentrated milk coming in from the device 6 is heated to a sufficiently high temperature and is maintained at that temperature for a time sufficient to kill all of the harmful micro-organisms occurring in the milk. It is known, for example, that maintaining the milk at approximately 68° C. for approximately 20 seconds is usually sufficient.

The dosing/mixing station 2 includes a dosing pump 8 which is connected in-line via a pipe 9 to the process pipe 4. The dosing pump 8 adds the additives necessary for cheese production to the concentrated and heated milk pumped by the pump 5 to the station 2. The dosing/mixing station 2 further contains a mixing device 10 provided with an inlet 10a and an outlet 10b for mixing the additives with the concentrated milk.

The filling station 3 preferably assists of a packaging machine of the type that is often used to package liquid food such as milk and juice and which forms, fills and closes the finished packagings 12. The filler pipe 13 attached to the packaging machine 12 is connected with the outlet 10b of the mixing device 10 via the process pipe 4, such that the mixture of concentrated milk and additives can be fed directly from the mixing device 10 to the filler pipe of the packaging machine for filling the packagings 12 intended for distribution.

With the aid of the device described a cheese is produced and prepared for distribution possessing the desired tubular passage structure, the form of the tubular passage structure being controlled according to the present invention, as follows. Assuming, for example, that the finished cheese is to have a DM content of between 40-70% and, further, that the device for concentrating that pretreated milk is an ultra-filtering device with a filter whose pore size is such that proteins, fats and other constituents valuable for cheese production and occurring in the milk cannot pass through the filter but are retained in the concentrated milk extracted as pre-cheese retained matter. It is further assumed that the heating device is a heat exchanger of conventional type with a capacity to heat and maintain the concentrated milk for a sufficiently long time at a sufficiently high temperature to neutralize all harmful micro-organisms occurring in the milk, say 68° C. for approximately 20 sec. Finally it is assumed that the milk selected for cheese production is standardized milk.

The standardized milk is introduced into the ultra-filtering device 6 through a product pipe 14 connected to the inlet 6a for concentration of the milk to a DM content corresponding to the DM content in the finished cheese, of between 40-70%. In the ultra-filtering device an aqueous fraction (whey), which is practically completely free from protein, fat and other valuable constituents occurring in the milk, is separated and passes freely through the filter. The separated aqueous fraction is drained off from the ultra-filtering device through an outlet pipe connected to the outlet 6c, while the concentrated milk (rich in protein and fat) retained by the filter is taken out of the ultra-filtering device through the process pipe 4 connected to the outlet 6b. This concentrated milk is pumped by the pump 5 into and through the heat exchanger 7 for heating to 68° C. for approximately 20 seconds. From the heating device the heated, concentrated milk is taken out and pumped further through the process pipe 4 to the dosing/mixing station 2. At the dosing/mixing station 2, additives necessary for coagulation of the milk, such as rennet, together with other additives selected for the cheese production, e.g. citric acid enclosed in capsules of liposomes and lactic acid bacteria, such as Sc. diacetylactis and L. cremoris, used for the fermentation of the citric acid and the development of $CO^2$ gas are added to the milk with the aid of the dosing pump 8 through the pipe 9 connected in-line to the process pipe 4. The mixture of concentrated milk and additives is passed through the process pipe 4 and into the mixing device 10 for homogeneous mixing of the additives with the concentrated milk. From the mixing device 10 the mixture is fed through the process pipe 4 connected to the outlet 10b into the filler pipe attached to the packaging machine 11 at the filling station 3 for drawing off and enclosing in packagings 12 intended for distribution, as shown schematically in the drawing.

With the aid of the device described cheeses with a controlled tubular passage structure of practically any desired type can be produced and prepared for distribution.

Through the present invention it is thus possible to produce a cheese and prepare it for distribution in a manner which can, in practice, be carried out in completely automatic fashion on a rational industrial scale. The present invention thus fully avoids or solves the previously problem of concerning non-existent of imperfect formation of tubular passages and produces cheese of various types with the controlled tubular passage structure aimed at.

I claim:

1. A method of producing cheese with tubular passage structures and preparing it for distribution, comprising the steps of:
    concentrating milk containing whey and lactic acid bacteria by separating the whey from the milk to attain a dry matter content of the concentrated milk corresponding to a dry matter content in finished cheese of between 40-70%;
    mixing the concentrated milk with coagulation additives and with citric acid;
    forming carbon dioxide gas by a reaction between the citric acid and lactic acid bacteria occurring in milk;
    packaging the concentrated milk mixed with additives and citric acid into distribution-ready packages;
    coagulating the packages concentrated milk into cheese; and
    forming tubular passage structures in the packaged, concentrated milk with the carbon dioxide gas as the milk coagulates in the packages.

2. A method as claimed in claim 1, comprising the further step of adding lactic acid bacteria to the milk, together with the citric acid and the coagulation additives.

3. A method as claimed in claim 1, comprising the further step of controlling the rate of conversion of the citric acid to carbon dioxide by adding the citric acid enclosed in capsules of butter fat.

4. A method as claimed in claim 1, comprising the further step of controlling the rate of conversion of the citric acid to carbon dioxide by adding the citric acid enclosed in capsules of liposomes.

5. A method as claimed in claim 1, wherein the lactic acid bacteria are Sc. diacetylactis.

6. A method as claimed in claim 1, wherein the lactic acid bacteria are L. cremoris.

* * * * *